(12) United States Patent
Ogiwara et al.

(10) Patent No.: US 7,003,954 B2
(45) Date of Patent: Feb. 28, 2006

(54) MASTER CYLINDER APPARATUS

(75) Inventors: Takato Ogiwara, Yamanashi-ken (JP); Toshio Takayama, Yamanashi-ken (JP)

(73) Assignee: Kabushiki Kaisha Hitachi Seisakusho, Tokyo (JP)

( * ) Notice: Subject to any disclaimer, the term of this patent is extended or adjusted under 35 U.S.C. 154(b) by 0 days.

(21) Appl. No.: 10/924,787

(22) Filed: Aug. 25, 2004

(65) Prior Publication Data

US 2005/0066656 A1    Mar. 31, 2005

(30) Foreign Application Priority Data

Sep. 30, 2003    (JP) .............................. 2003-341338

(51) Int. Cl.
*B60T 8/00* (2006.01)
(52) U.S. Cl. .......................................... 60/568; 60/588
(58) Field of Classification Search .................. 60/568, 60/570, 588, 566, 562
See application file for complete search history.

(56) References Cited

U.S. PATENT DOCUMENTS

| 4,324,101 | A | * | 4/1982 | Farr | ............................ | 60/562 |
| 6,192,685 | B1 | | 2/2001 | Bourlon et al. | ................ | 60/566 |
| 6,519,940 | B1 | * | 2/2003 | Lange et al. | ................... | 60/562 |
| 6,796,125 | B1 | * | 9/2004 | Kusano et al. | ................. | 60/588 |
| 6,808,238 | B1 | * | 10/2004 | Drott et al. | .............. | 303/114.1 |
| 6,848,257 | B1 | * | 2/2005 | Bacardit et al. | .............. | 60/588 |

* cited by examiner

*Primary Examiner*—Thomas E. Lazo
(74) *Attorney, Agent, or Firm*—Wenderoth, Lind & Ponack, L.L.P.

(57) ABSTRACT

A master cylinder apparatus for a BBW system is provided, which eliminates a risk of brake delay, even with the use of a plunger-type master cylinder, and which therefore is able to achieve a reduction in size of a master cylinder. The master cylinder apparatus comprises a tandem-type master cylinder connected to wheel cylinders through fail-safe valves and a stroke simulator for ensuring a desired stroke of a brake pedal upon receiving a brake fluid introduced from a fluid pressure chamber in the master cylinder. The master cylinder is arranged in the form of a plunger-type master cylinder in which cup seals are provided on an inner surface of a bore of the cylinder body. A spring force of a second return spring for a secondary piston is set to be larger than that of a first return spring for a primary piston. A retracted position of the secondary piston is limited by a stopper pin extending through an oblong hole formed in the secondary piston.

4 Claims, 8 Drawing Sheets

MASTER CYLINDER APPARATUS

BACKGROUND OF THE INVENTION

The present invention relates to a brake system for an automobile. More specifically, the present invention relates to a master cylinder apparatus used in a brake fluid pressure controlling system for electrically controlling a fluid pressure supplied to wheel cylinders; i.e., a so-called brake-by-wire (BBW) system.

A master cylinder apparatus for a BBW system comprises a master cylinder adapted to be connected to wheel cylinders through fail-safe valves and a stroke simulator for ensuring a desired stroke of a brake pedal upon receiving a brake fluid introduced from the master cylinder. In the event of failure of the BBW system, the fail-safe valves are opened, and the fluid pressure generated in the master cylinder is supplied to the wheel cylinders.

This type of related art is disclosed in, for example, U.S. Pat. No. 6,192,685 B1.

However, the master cylinder apparatus of U.S. Pat. No. 6,192,685 B1 is configured such that supply of brake fluid from a reservoir to a primary-side pressure chamber and a secondary-side pressure chamber is controlled by means of a center valve. Consequently, axial dimensions of the primary piston and the secondary piston are large, and an overall size of a master cylinder is also large.

To counter this problem, it has been suggested to use a plunger-type master cylinder in which cup seals are provided on an inner surface of a bore of a cylinder body, so as to seal outer circumferential surfaces of a primary piston and a secondary piston, each of which is subject to a sliding movement in the cylinder body. In the case of a master cylinder apparatus for a BBW system, it is generally required to set a spring force of a return spring for biasing a secondary piston to be larger than that of a return spring for biasing a primary piston, so as to limit a force that a driver is required to apply to a brake pedal. In such a configuration, since a spring force for biasing the secondary piston must be made large, and a return position (a retracted position) of the secondary piston during non-braking is therefore variable, a possibility exists that in the event of a failure of the BBW system, an invalid stroke for operating the secondary piston will be large, resulting in a delay in braking.

SUMMARY OF THE INVENTION

The present invention has been made with a view to overcoming the drawbacks of the prior art, as stated above. It is therefore an object of the present invention to provide a master cylinder apparatus which eliminates a risk of brake delay in the event of failure of a BBW system, even with the use of a plunger-type master cylinder, and which therefore is able to safely achieve a reduction in size of a master cylinder.

In order to achieve the above-mentioned object, the present invention provides a master cylinder apparatus comprising:

a tandem-type master cylinder adapted to be connected to wheel cylinders through fail-safe valves; and a stroke simulator for ensuring a desired stroke of a brake pedal upon receiving a brake fluid introduced from a primary-side fluid pressure chamber formed in the master cylinder, wherein:

the tandem-type master cylinder comprises:

a cylinder body;

a primary piston and a secondary piston arranged in an axial direction of the cylinder body and being capable of sliding movement in the cylinder body;

the primary-side fluid pressure chamber, which is defined between the primary piston and the secondary piston;

a secondary-side fluid pressure chamber defined between the secondary piston and the cylinder body;

a first circumferential groove and a second circumferential groove formed in an inner surface of a bore of the cylinder body, the first circumferential groove and the second circumferential groove being spaced apart from each other in the axial direction of the cylinder body;

a first cup seal provided in the first circumferential groove and adapted to seal an outer circumferential surface of the primary piston;

a second cup seal provided in the second circumferential groove and adapted to seal an outer circumferential surface of the secondary piston;

a first return spring provided in the primary-side fluid pressure chamber so as to bias the primary piston in a direction for retraction;

a second return spring provided in the secondary-side fluid pressure chamber so as to bias the secondary piston in the direction for retraction; and a limiting means provided in the cylinder body so as to limit a retracted position of the secondary piston.

In this master cylinder apparatus, the second return spring for biasing the secondary piston may have a larger spring force than the first return spring for biasing the primary piston. The limiting means may comprise a stopper pin which extends across the bore of the cylinder body, the stopper pin being provided in an oblong hole extending through the secondary piston.

In the master cylinder apparatus arranged as mentioned above, there is provided a limiting means adapted to limit a retracted position of a secondary piston; as a result of which a retracted position of the secondary piston remains constant, even in a case that a spring force of a return spring for biasing the secondary piston is larger than that of a return spring for biasing a primary piston. By this means, an invalid stroke of the secondary piston can be markedly reduced. Further, by use of a plunger-type master cylinder, an axial dimension of a master cylinder can also be reduced.

Since the retracted position of the secondary piston is limited by the limiting means, an invalid stroke of the secondary piston is reduced. Therefore, in the event of failure of the BBW system, brake delay does not occur, and the apparatus is made highly reliable. Further, since an axial dimension of a master cylinder is reduced by use of a plunger-type master cylinder, the master cylinder apparatus is easily mountable on a vehicle.

DETAILED DESCRIPTION OF THE INVENTION

Hereafter, an embodiment of the present invention is described, with reference to the accompanying drawings.

Figure 1:
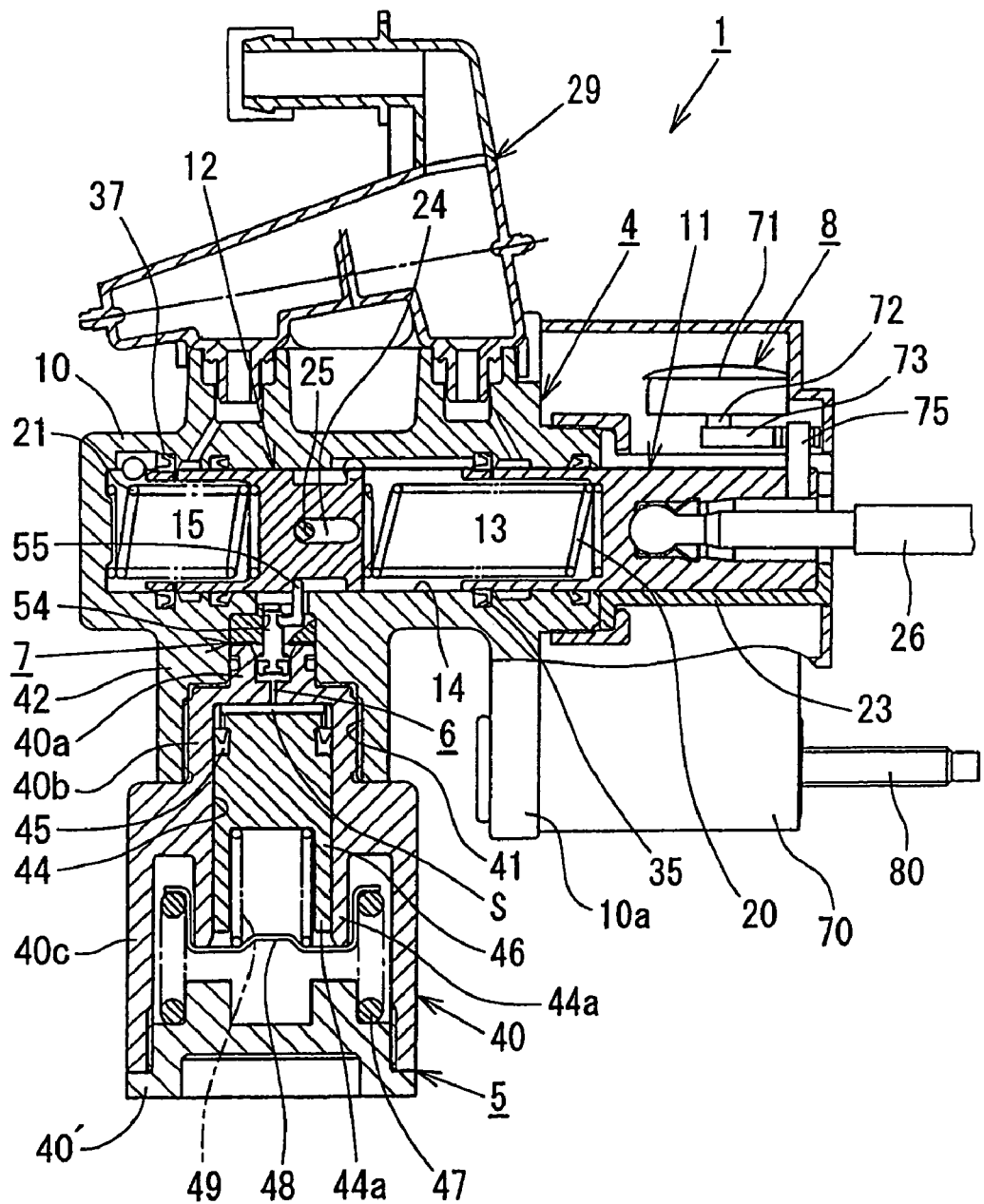
FIG. 1 is a cross-sectional view showing an entire structure of a master cylinder apparatus according to an embodiment of the present invention.
Figure 2:
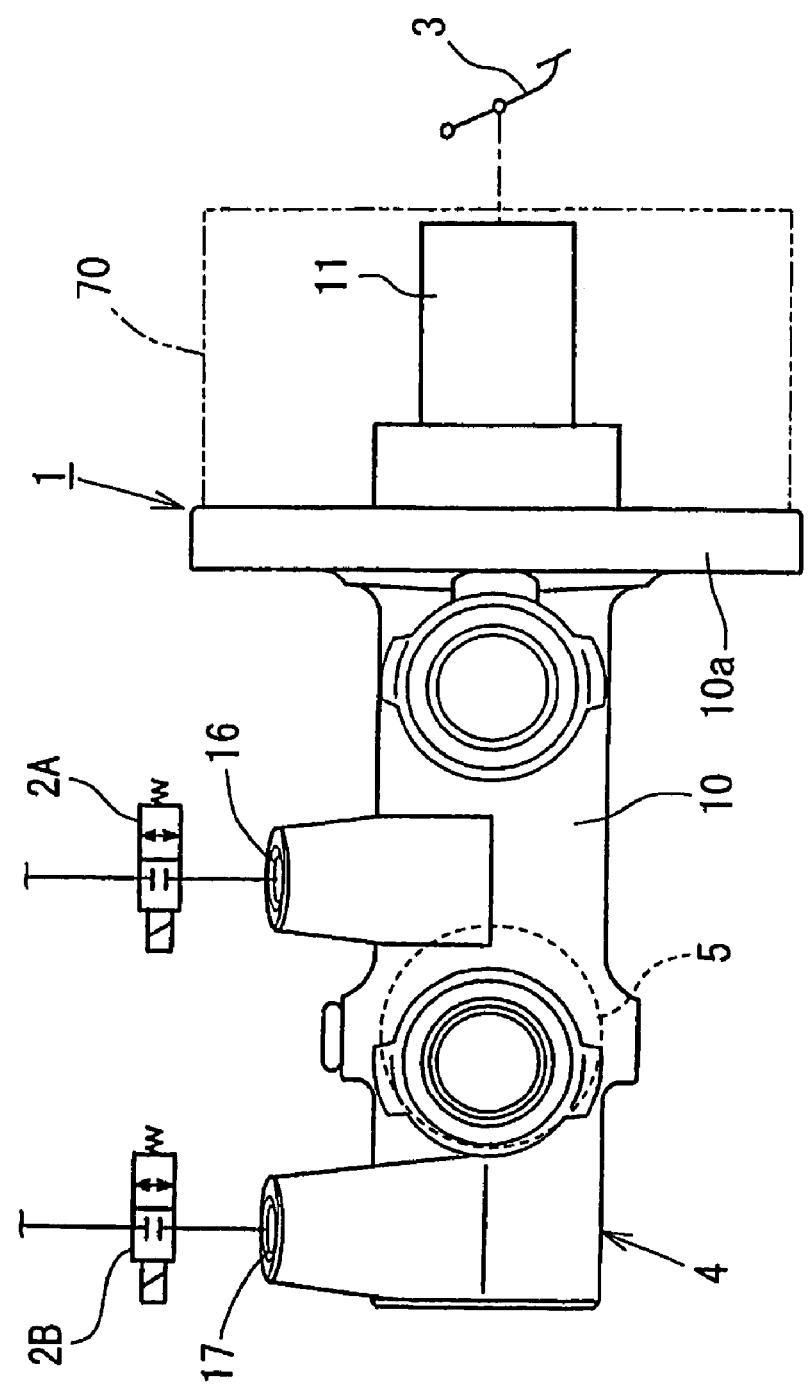
FIG. 2 is a side view showing the entire structure of the master cylinder apparatus of FIG. 1.

FIGS. 1 and 2 show the entire structure of a master cylinder apparatus according to an embodiment of the present invention. A master cylinder apparatus 1 is used in a BBW system described above. The master cylinder apparatus 1 is connected to wheel cylinders (not shown) through fail-safe valves 2A and 2B. The master cylinder apparatus 1 comprises a tandem-type master cylinder 4 for generating a fluid pressure corresponding to a force applied to a brake pedal 3, and a stroke simulator 5 for ensuring a desired stroke of the brake pedal 3. The stroke simulator 5 is externally mounted on a cylinder body 10 of the master cylinder 4. A first fluid pressure chamber (a primary-side fluid pressure chamber) 13 is defined between a primary piston 11 and a secondary piston 12 provided in the master cylinder 4. When the brake pedal 3 is operated, a brake fluid in the first fluid pressure chamber 13 is introduced into the stroke simulator 5, to thereby ensure a desired stroke of the brake pedal 3.

The master cylinder apparatus 1 further comprises an opening/closing means 7 and a stroke sensor 8. The opening/closing means 7 is provided in a simulator passage 6 which allows communication between the first fluid pressure chamber 13 in the master cylinder 4 and the stroke simulator 5. The stroke sensor 8 is adapted to detect a stroke of the primary piston 11 (a piston stroke), which moves in the master cylinder 4 in accordance with the movement of the brake pedal 3. The BBW system comprises a fluid pressure controlling means including a fluid pressure source, a fluid pressure control valve and an electronic control unit, etc., in addition to the master cylinder apparatus 1. Normally, the fluid pressure controlling means controls a fluid pressure supplied to the wheel cylinders, on the basis of a detection signal emitted from the stroke sensor 8.

Figure 3:
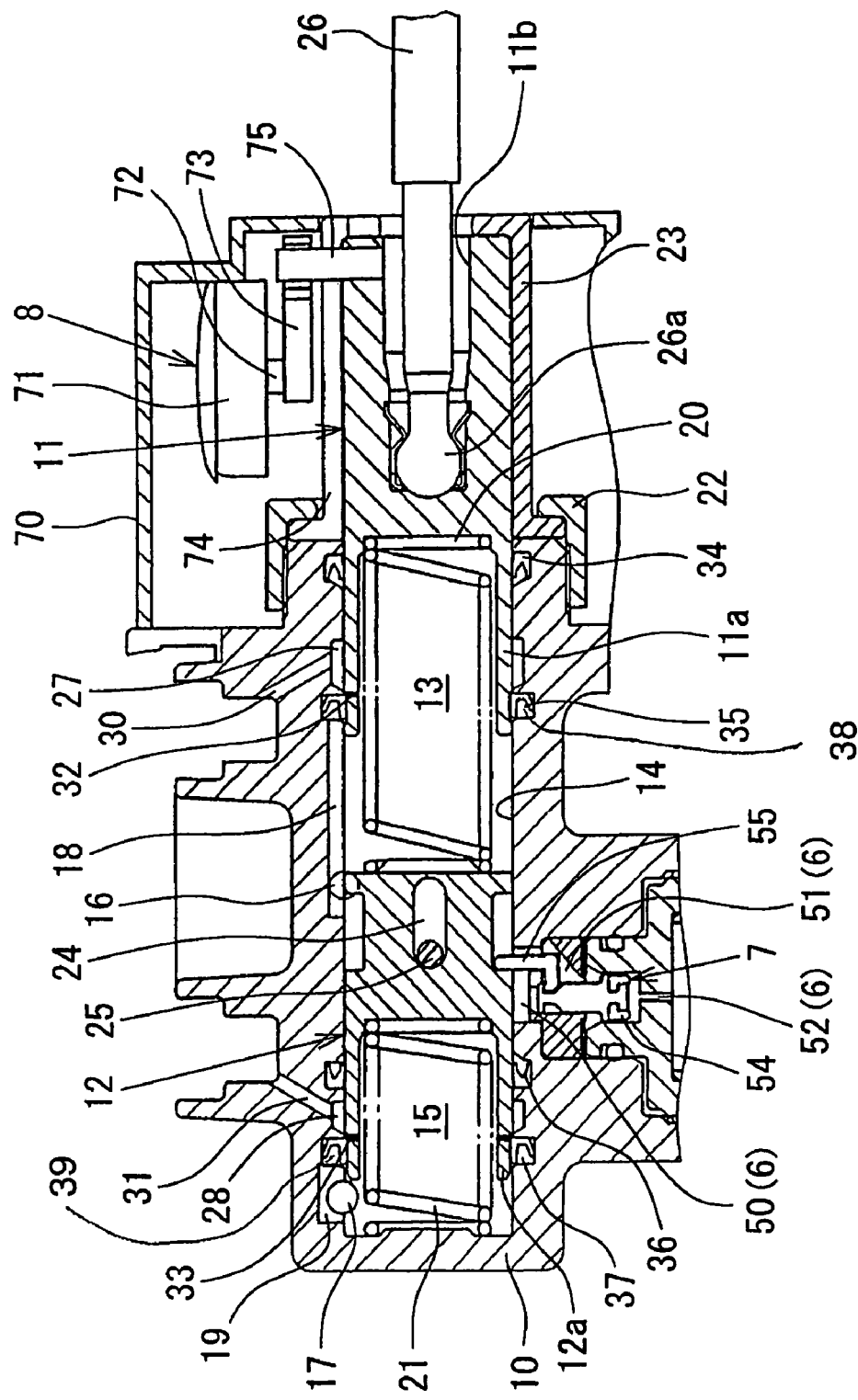
FIG. 3 is a cross-sectional view showing a structure of a master cylinder of the master cylinder apparatus of FIG. 1.

The master cylinder 4 is arranged in the form of a plunger-type master cylinder. The cylinder body 10 is arranged in the form of a cylinder having one end closed, as shown in FIG. 3. The primary piston 11 and the secondary piston 12 are slidably provided in a bore 14 of the cylinder body 10.

A forward end (an end for insertion into the bore 14) of the primary piston 11 forms a cup-like portion 11a. The first fluid pressure chamber 13 is defined between the cup-like portion 11a of the primary piston 11 and the secondary piston 12. A forward end of the secondary piston 12 also forms a cup-like portion 12a. A second fluid pressure chamber (a secondary-side fluid pressure chamber) 15 is defined between the cup-like portion 12a and the closed end of the cylinder body 10. The cylinder body 10 includes a first discharge port 16 for supplying brake fluid from the first fluid pressure chamber 13 to the corresponding wheel cylinders, and a second discharge port 17 for supplying brake fluid from the second fluid pressure chamber 15 to the corresponding wheel cylinders. The first discharge port 16 opens into a longitudinal groove 18 formed in an inner surface of the bore 14 of the cylinder body 10; and the second discharge port 17 opens into a longitudinal groove 19 formed in the inner surface of the bore 14 of the cylinder body 10.

A first return spring 20 is provided between a bottom of the cup-like portion 11a of the primary piston 11 and the secondary piston 12. A second return spring 21 is provided between a bottom of the cup-like portion 12a of the secondary piston 12 and the closed end of the cylinder body 10. Normally, spring forces of the first and second return springs 20 and 21 bias each of the pistons 11 and 12 in a direction away from the bore 14.

The spring force of the second return spring 21 for biasing the secondary piston 12 is set to be larger than that of the first return spring 20 for biasing the primary piston 11.

Figure 4:
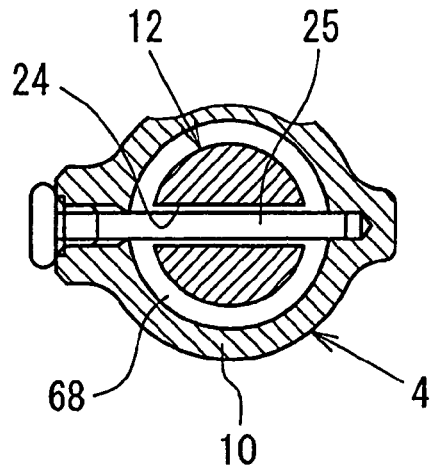
FIG. 4 is an enlarged cross-sectional view of a part of the master cylinder of FIG. 3.

A rear end portion of the cylinder body 10 is connected to a piston guide 23 in the form of a cylinder having one end closed, by means of a retaining member 22 threadably engaged with the rear end portion of the cylinder body 10. A bottom plate of the piston guide 23 prevents the primary piston 11 from separating from the bore 14, while limiting a retracted position of the primary piston 11. A retracted position of the secondary piston 12 is limited by a stopper pin (a limiting means) 25 which is inserted into a diametrical hole (an oblong hole) 24 extending through a solid portion of the secondary piston 12. As shown in FIG. 4, the stopper pin 25 extends across the bore 14, with a base end portion thereof being threadably engaged with a wall of the cylinder body 10.

A rear end (opposite to the end for insertion) of the primary piston 11 includes a recess 11b extending along the axis of the primary piston 11. An input shaft 26 extending from the brake pedal 3 is inserted into the recess 11b. The input shaft 26 is locked in the recess 11b in a state such that a spherical portion 26a formed at a forward end of the input shaft 26 abuts against a bottom part of the recess 11b. The primary piston 11 is adapted to advance toward a closed end of the bore 14 under a force applied from the brake pedal 3 through the input shaft 26.

The inner surface of the bore 14 of the cylinder body 10 includes two annular grooves 27 and 28. The annular groove 27 faces the primary piston 11, and the annular groove 28 faces the secondary piston 12. A reservoir port 30 communicating with a reservoir 29 mounted on the top of the cylinder body 10 opens into the annular groove 27. A reservoir port 31 communicating with the reservoir 29 opens into the annular groove 28. The cup-like portion 11a of the primary piston 11 includes a supply port 32, and the cup-like portion 12a of the secondary piston 12 includes a supply port 33. When the primary piston 11 and the secondary piston 12 are located at their respective retracted positions, the supply port 32 and the supply port 33 are open to the annular groove 27 and the annular groove 28, respectively. In this state, brake fluid is supplied from the reservoir 29 to the first fluid pressure chamber 13 and the second fluid pressure chamber 15.

A pair of cup seals 34 and 35 are provided on the inner surface of the bore 14 of the cylinder body 10, with the primary-side annular groove 27 being disposed therebetween. Further, on the inner surface of the bore 14 of the cylinder body 10, a pair of cup seals 36 and 37 are provided, with the secondary-side annular groove 28 being disposed therebetween.

Of the cup seals on the primary side, the cup seal 34 located on a side of an open end of the bore 14 serves to seal the first fluid pressure chamber 13 from the outside. Of the cup seals on the secondary side, the cup seal 36 located on a side of the open end of the bore 14 serves to prevent communication between the first fluid pressure chamber 13 and the second fluid pressure chamber 15.

On the other hand, of the cup seals on the primary side, the cup seal 35 located on a side of the closed end of the bore 14 serves to prevent flow of the fluid from the first fluid pressure chamber 13 to the annular groove 27 communicated with the reservoir 29. Of the cup seals on the secondary side, the cup seal 37 located on a side of the closed end of the bore 14 serves to prevent flow of the fluid from the second fluid pressure chamber 15 to the annular groove 28 communicated with the reservoir 29.

Figure 5:
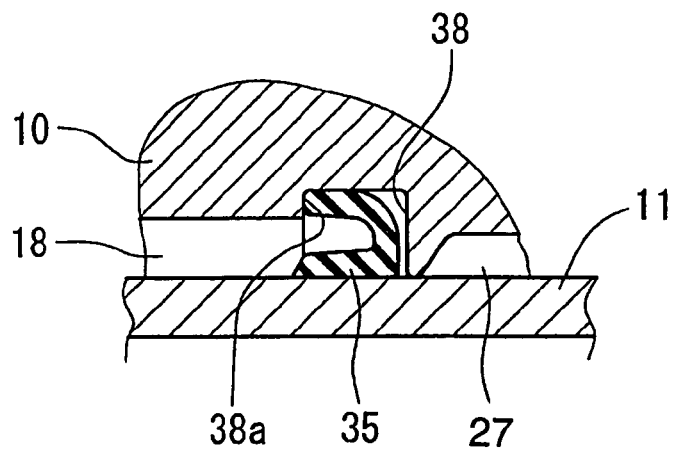
FIG. 5 is a cross-sectional view showing a primary-side cup seal in assembled position.
Figure 6:
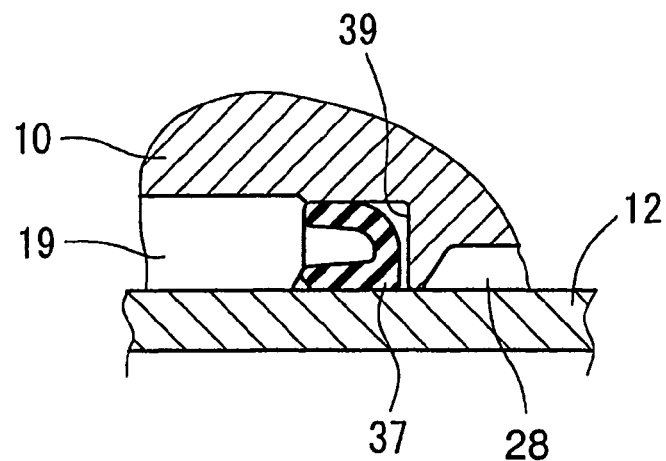
FIG. 6 is a cross-sectional view showing a secondary-side cup seal in assembled position.

The primary-side cup seals 34 and 35 and the secondary-side cup seals 36 and 37 are respectively provided in annular grooves formed in the inner surface of the bore 14 of the cylinder body 10. The cup seal 35 on a side of the closed end of the bore 14 is provided in an annular groove 38, which is communicated with the longitudinal groove 18 formed in the inner surface of the bore 14. The cup seal 37 on a side of the closed end of the bore 14 is provided in an annular groove 39, which is communicated with the longitudinal groove 19 formed in the inner surface of the bore 14. As shown in FIG. 5, the longitudinal groove 18, which is communicated with the annular groove 38 in which the primary-side cup seal 35 is provided, is shallower than the annular groove 38. That is, an outer circumferential edge of the cup seal 35 abuts against a front wall surface 38a of the annular groove 38 to limit a flow of the fluid from the annular groove 27 behind the cup seal 35 to the first fluid pressure chamber 13. In contrast, as shown in FIG. 6, the longitudinal groove 19, which is communicated with the annular groove 39 in which the secondary-side cup seal 37 is provided, has a depth equal to or slightly larger than the depth of the annular groove 39, thus allowing flow of the fluid from the annular groove 28 behind the cup seal 37 to the second fluid pressure chamber 15.

As shown in FIG. 1, the stroke simulator 5 comprises a simulator body 40 having a stepped configuration including a small-diameter portion 40a, an intermediate-diameter portion 40b and a large-diameter portion 40c. External threads are formed in an outer circumferential surface of the intermediate-diameter portion 40b. On the other hand, a boss portion 42 having a stepped inner surface defining a fitting opening 41 is projected from the cylinder body 10 of the master cylinder 4. A large-diameter portion of the fitting opening 41 has internal threads. The simulator body 40 of the stroke simulator 5 is directly connected to the cylinder body 10 by threadably engaging the intermediate-diameter portion 40b with the fitting opening 41 of the cylinder body 10. Thus, the simulator body 40 of the stroke simulator 5 is mounted on an exterior surface of the cylinder body 10. To connect the simulator body 40 to the cylinder body 10, the small-diameter portion 40a at a forward end of the simulator body 40 is press-fitted into a small-diameter portion of the fitting opening 41 through a seal member 43 (see FIG. 7).

Figure 7:
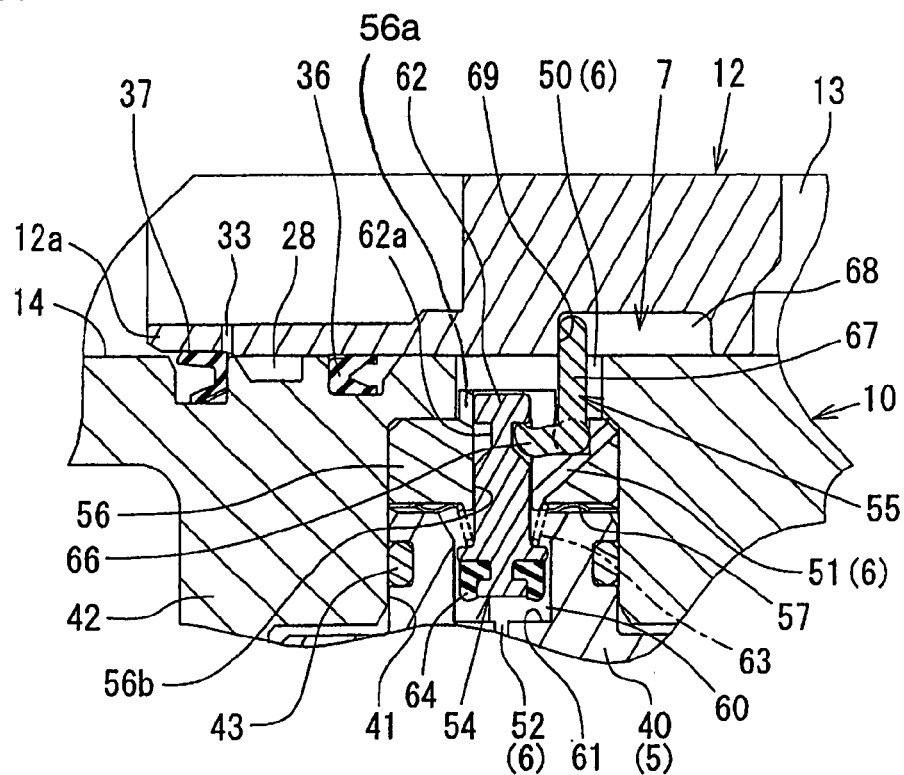
FIG. 7 is a cross-sectional view showing a structure of an opening/closing means of the master cylinder apparatus of FIG. 1.

The simulator passage 6 which communicates the first fluid pressure chamber 13 of the master cylinder 4 with the stroke simulator 5 comprises a port 50 (described later) formed at a bottom end of the fitting opening 41 of the cylinder body 10, a fluid passage 51 in the opening/closing means 7 and a fluid passage 52 formed in the simulator body 40 (FIGS. 3 and 7).

As indicated in FIG. 1, the simulator body 40 of the stroke simulator 5 includes a bore 44 having an end wall. A piston 46 is slidably provided in the bore 44 through a cup seal 45. A pressure chamber S is defined between a forward end (an end for insertion into the bore 44) of the piston 46 and the end wall of the bore 44, which pressure chamber is sealed by the cup seal 45. The fluid passage 52 forming the simulator passage 6 opens into the pressure chamber S. The large-diameter portion 40c of the simulator body 40 has a hollow portion. The bore 44 is extended so as to form a cylindrical extension 44a in the hollow portion of the large-diameter portion 40c. The large-diameter portion 40c of the simulator body 40 has an open end on a side opposite to the small-diameter portion 40a. The open end of the large-diameter portion 40c is closed by a cover plate 40'. A spring bearing 48 is provided at a distal end of the cylindrical extension 44a of the large-diameter portion 40c, so as to face the cover plate 40'. A first spring 47 is disposed between the spring bearing 48 and the cover plate 40'. One end of the first spring 47 is seated on the cover plate 40'. The other end of the first spring 47 is received by the spring bearing 48. Further, a second spring 49 having a smaller spring force than the first spring 47 is provided inside the cylindrical extension 44a. The second spring 49 is interposed between the spring bearing 48 and a cup-like surface of the piston 46 and normally biases the piston 46 in an upward direction. In the stroke simulator 5, when the fluid pressure in the pressure chamber S rises, the piston 46 first moves downward against the spring force of the second spring 49 and abuts against the spring bearing 48. Thereafter, the piston 46 moves downward against the spring force of the first spring 47.

Figure 8:
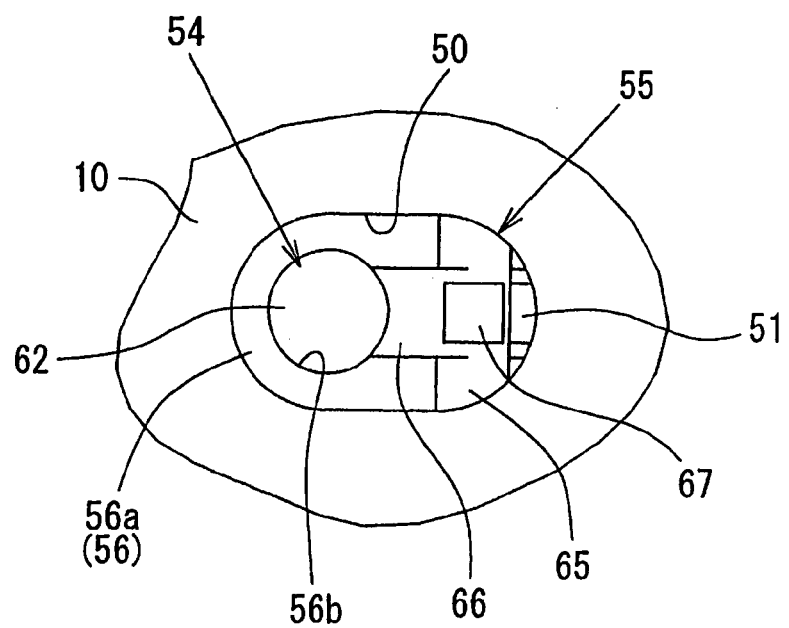
FIG. 8 is a plan view of the opening/closing means shown in FIG. 7, as viewed from inside a bore of the master cylinder.

As is clearly shown in FIGS. 7 to 10, the opening/closing means 7 comprises a poppet valve 54 for opening and closing the fluid passage 52 (the simulator passage 6) in the simulator body 40 and a rocking lever 55 which is movable together with the secondary piston 12 in the master cylinder 4 to open and close the poppet valve 54. The poppet valve 54 and the rocking lever 55 are assembled in a casing 56, to form a unit. To assemble the simulator body 40 to the fitting opening 41 of the boss portion 42 of the cylinder body 10, the unit is connected between the cylinder body 10 and the simulator body 40 through a washer 57. As indicated in FIG. 8, the port 50 forming the simulator passage 6 on a side of the cylinder body 10 has an oblong (non-circular) form, which extends in an axial direction of the bore 14 of the cylinder body 10. The casing 56 includes a C-shaped projection 56a projected upwardly therefrom. The C-shaped projection 56a is fitted into the oblong port 50 while being located close to the front side (on a side of the closed end of the bore 14) of the oblong port 50. Thus, by means of the oblong port 50, the casing 56 is prevented from rotating.

The poppet valve 54 comprises a valve seat 61, a valve body 62 adapted to move to and away from the valve seat 61 and a valve spring 63 which normally biases the valve body 62 in a direction for closing the valve. The valve seat 61 is formed at the bottom of a recess 60 formed in the simulator body 40, so as to surround an opening of the fluid passage 52. The fluid passage 52 is closed when the valve body 62 is seated on the valve seat 61, and is open when the valve body 62 is separated from the valve seat 61. The valve spring 63 has one end engaged with the casing 56, and normally biases the valve body 62 in the direction for closing the valve. The valve body 62 is slidably fitted into a through-hole 56b formed in the casing 56, with a lower end thereof being connected to an elastic member 64 capable of intimate contact with the valve seat 61. An upper end portion of the valve body 62 includes a constricted portion 62a engageable with the rocking lever 55. The fluid passage 51 in the opening/closing means 7, which forms the simulator passage 6, is an inclined passage formed in the casing 56, with one end thereof opening into the through-hole 56b. Therefore, when the poppet valve 54 is open, as shown in FIG. 7, brake fluid in the first fluid pressure chamber 13 of the master cylinder 4 is supplied to the stroke simulator 5 through the port 50 in the cylinder body 10, the fluid passage 51 in the casing 56, the recess 60 around the valve body 62 and the fluid passage 52 in the simulator body 40. The material of the elastic member 64 is not particularly limited, as long as it is capable of intimate contact with the valve seat 61. Various materials, such as rubber, resin, etc., may be used for the elastic member 64.

Figure 9:
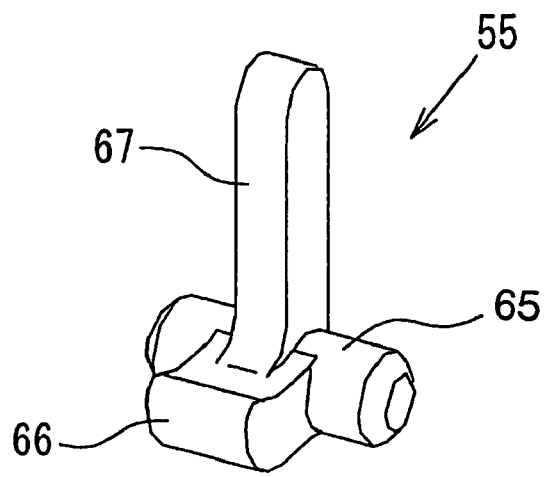
FIG. 9 is a perspective view of a rocking lever of the opening/closing means of FIG. 7.

As is clearly shown in FIG. 9, the rocking lever 55 comprises a shaft portion 65 supported by a shaft bearing portion formed in the casing 56, a claw portion 66 extending radially outwardly from the shaft portion 65 and a columnar portion 67 extending from the shaft portion 65 substantially at a right angle relative to the claw portion 66. The claw portion 66 is engageable with the constricted portion 62a of the valve body 62. When the rocking lever 55 is supported by the casing 56, an upper end of the columnar portion 67 of the rocking lever 55 extends through the port 50 of the cylinder body 10 into the bore 14. A rear end portion of the secondary piston 12 includes an annular groove 68. The upper end of the columnar portion 67 is positioned within the annular groove 68.

Figure 10:
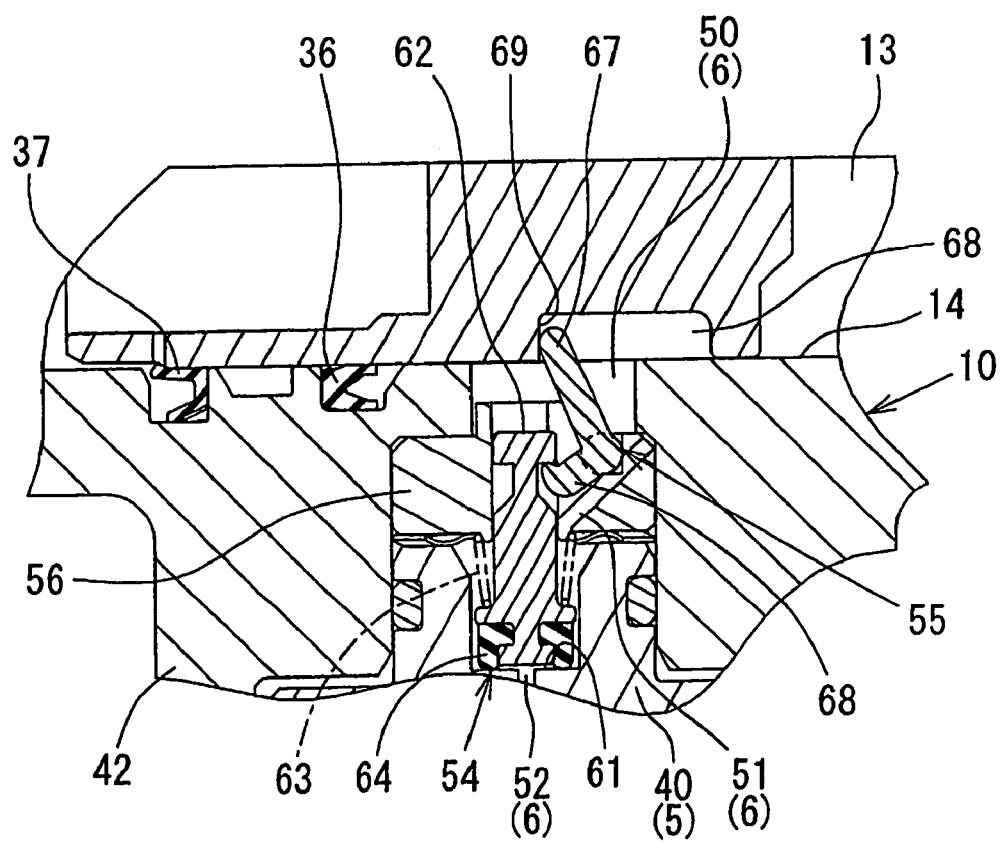
FIG. 10 is a cross-sectional view showing an operation of the opening/closing means of FIG. 7.

When the secondary piston 12 is located at the retracted position, a front wall surface 69 of the annular groove 68 is positioned close to the rear side of the oblong port 50. In this state, the columnar portion 67 of the rocking lever 55 is rotated by the front wall surface 69 in a clockwise direction in FIG. 7, and finally abuts against the front wall surface 69 and maintains an upright position (FIG. 7). Consequently, the valve body 62 of the poppet valve 54 is lifted by the claw portion 66 and, as shown in FIG. 7, the fluid passage 52 (the simulator passage 6) on a side of the stroke simulator 5 is opened. When the secondary piston 12 advances from the retracted position, the front wall surface 69 moves in a leftward direction in FIG. 7, to thereby release the force of the rocking lever 55 lifting the valve body 62 of the poppet valve 54. Since the valve body 62 is biased in the valve-closing direction by means of the valve spring 63, the rocking lever 55 rocks about the shaft portion 65, and the fluid passage 52 is closed, as shown in FIG. 10.

As shown in FIGS. 1 and 3, the stroke sensor 8 is provided in a cover 70 connected to a flange portion 10a at the rear end portion of the cylinder body 10. The stroke sensor 8 comprises a sensor body 71 containing a rotation angle detector (not shown), a rotary shaft 72 extending from the rotation angle detector downward beyond the lower surface of the sensor body 71, a sensor arm 73 having one end fixedly connected to the rotary shaft 72, and a sensor pin 75. The sensor pin 75 extends upward from the rear end of the primary piston 11 and extends through a slit 74 formed in the piston guide 23 toward the sensor body 71.

Figure 11:
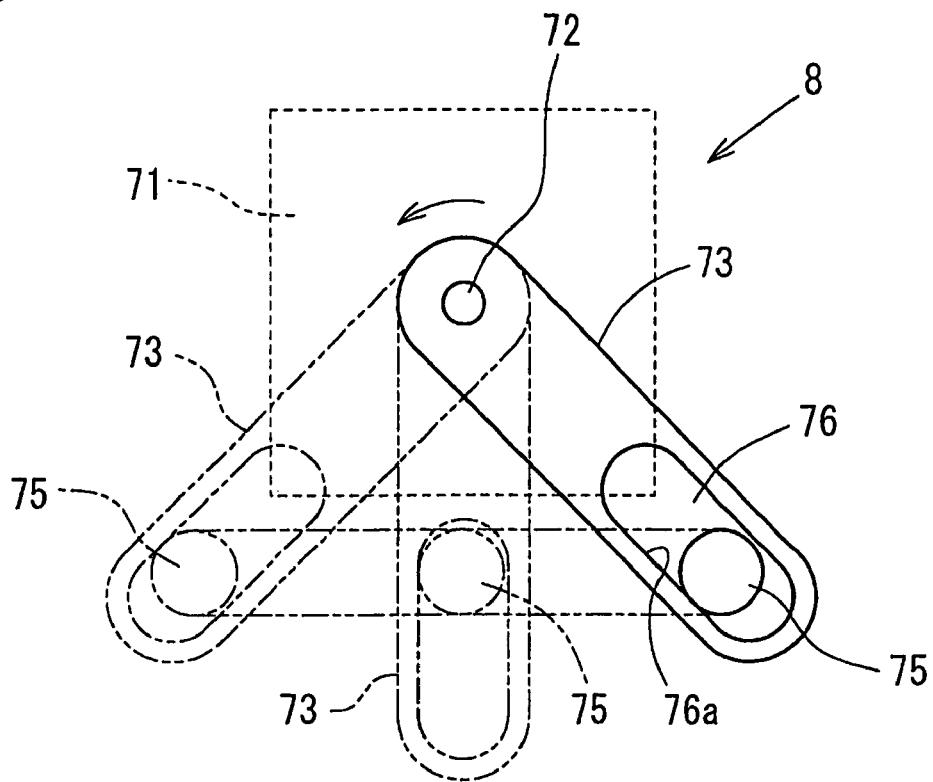
FIG. 11 is a schematic diagram showing a structure of a stroke sensor of the master cylinder apparatus of FIG. 1.
Figure 14:
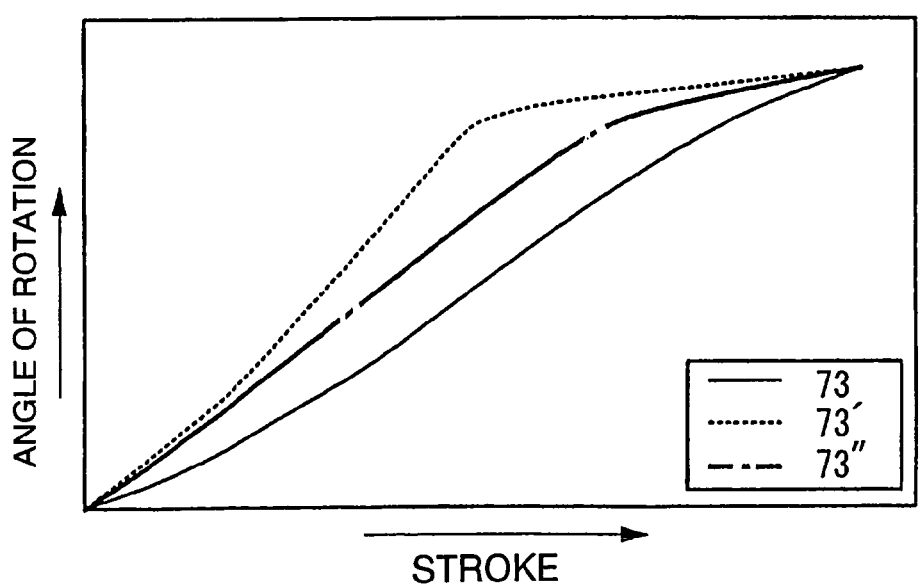
FIG. 14 is a graph indicating a relationship between the stroke and the angle of rotation in each of the stroke sensors shown in FIGS. 11 to 13.

As is clearly shown in FIG. 11, an oblong hole 76 is formed in the other end of the sensor arm 73. An upper end portion of the sensor pin 75 is inserted into the oblong hole 76. The sensor pin 75 is adapted to linearly move, together with the primary piston 11, in the slit 74 formed in the piston guide 23. The oblong hole 76 of the sensor arm 73 has a length sufficient for ensuring a linear movement of the sensor pin 75, and has a width sufficient for ensuring a smooth motion of the sensor pin 75. The sensor arm 73 is biased in a counterclockwise direction as viewed in FIG. 11, by means of a biasing means (not shown). By this arrangement, a wall surface 76a on one side of the oblong hole 76 is always pressed against the sensor pin 75. That is, the sensor pin 75 is adapted to perform linear movement without play in the oblong hole 76 of the sensor arm 73. Therefore, an amount of linear movement of the primary piston 11 can be accurately converted to an amount of rotation of the rotary shaft 72. In this case, as indicated by a solid line in FIG. 14, a substantially linear relationship exists between the amount of linear movement of the primary piston 11 and the angle of rotation of the rotary shaft 72, as a result of which accurate sensing can be stably conducted over an entire length of a stroke.

Figure 12:
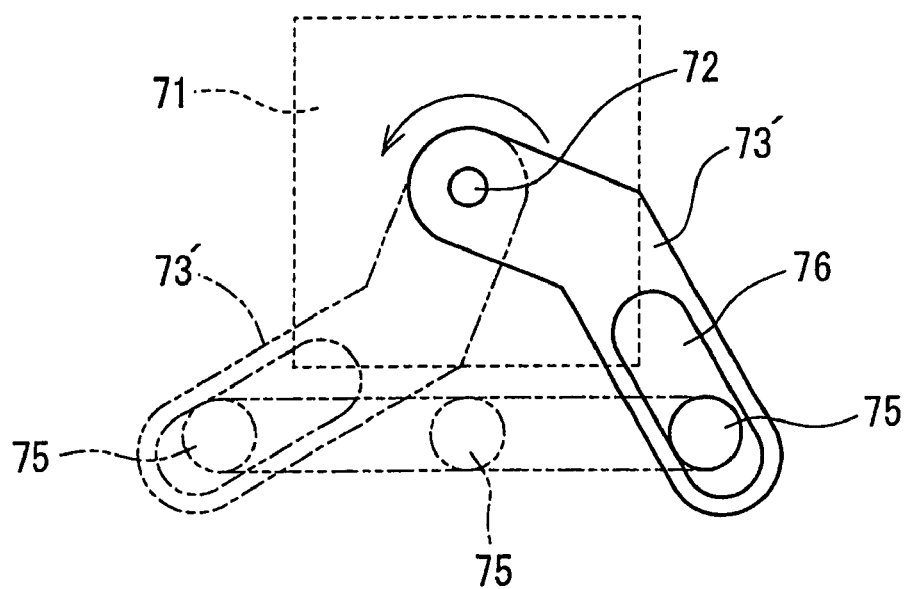
FIG. 12 is a schematic diagram showing a modified example of a stroke sensor of the master cylinder apparatus.
Figure 13:
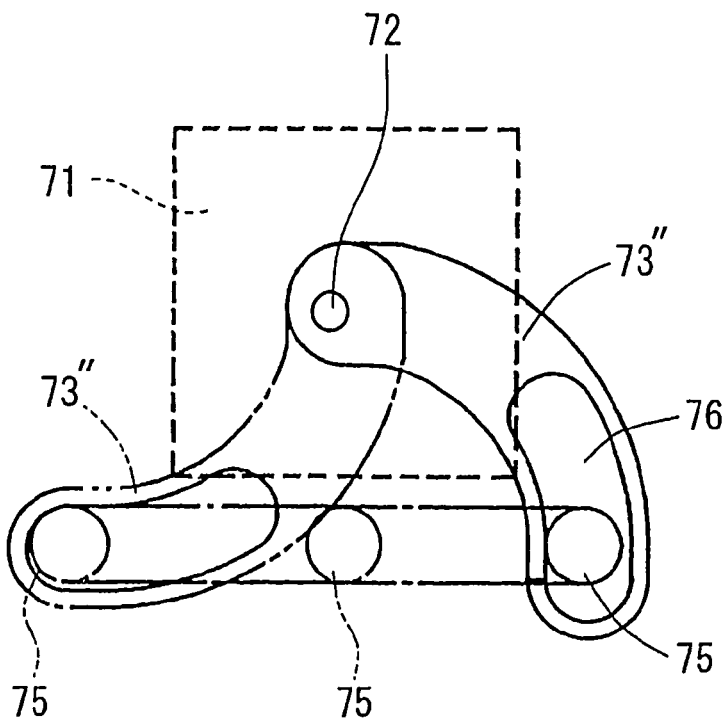
FIG. 13 is a schematic diagram showing another modified example of a stroke sensor of the master cylinder apparatus.

Instead of the sensor arm 73 having a straight form shown in FIG. 11, a V-shaped sensor arm 73' as shown in FIG. 12 or a curved sensor arm 73" as shown in FIG. 13 may be employed.

The sensor arm 73' is bent in a direction outward relative to a line connecting the rotary shaft 72 and the sensor pin 75, and the sensor arm 73" is curved outward relative to the line connecting the rotary shaft 72 and the sensor pin 75. In the sensor arm 73", the oblong hole 76 is also curved. When the V-shaped sensor arm 73' is used, as indicated by a dotted line in FIG. 14, high resolution can be obtained during early periods of a stroke while resolution near the end of the stroke is somewhat compromised. When the curved sensor arm 73" is used, as indicated by a one-dot chain line in FIG. 14, a resolution obtained is intermediate between those of the sensor arms 73 and 73'. However, the relationship between the angle of rotation and the stroke becomes linear, with the result that data processing using a sensor output can be easily conducted.

Hereinbelow, an operation of the master cylinder apparatus 1 is described. The master cylinder apparatus 1 is connected to a vehicle body using a stud bolt 80. The stud bolt 80 extends from a front side of the flange portion 10a of the cylinder body 10 through the cover 70 that accommodates the stroke sensor 8.

First, when the BBW system is normally operated, the fail-safe valves 2A and 2B are closed. Therefore, dependent on a force applied to the brake pedal 3, the primary piston 11 advances in a leftward direction as viewed in FIGS. 1 and 3, and a fluid pressure corresponding to the input from the brake pedal 3 is generated in the first fluid pressure chamber 13. In this instance, the poppet valve 54 of the opening/closing means 7 is open due to engagement with the secondary piston 12 at the retracted position (FIG. 7). Therefore, the brake fluid in the first fluid pressure chamber 13 passes through the port 50 of the cylinder body 10, the fluid passage 51 in the opening/closing means 7 and the fluid passage 52 in the simulator body 40 and is supplied to the pressure chamber S in the stroke simulator 5.

Although the secondary piston 12 marginally advances in accordance with the rise in pressure in the first fluid pressure chamber 13, the poppet valve 54 is not caused to close as a result of this movement of the secondary piston 12.

When brake fluid is introduced into the pressure chamber S of the stroke simulator 5, the piston 46 first moves downward against the spring force of the second spring 49 having a force smaller than that of the first spring 47, so as to ensure an appropriate initial stroke of the brake pedal 3. After the piston 46 abuts against the spring bearing 48, the piston 46 moves downward against the spring force of the first spring 47, which is larger than that of the second spring 49, to thereby ensure a desired stroke of the brake pedal 3. As the piston 46 moves downward, a reactive force acting on the brake pedal 3 increases. In this way, a so-called pedal resistance is generated, to thereby obtain an optimum pedal-feel. Meanwhile, the amount of movement of the primary piston 11 is monitored by the stroke sensor 8. Based on a signal emitted from the stroke sensor 8 (a piston stroke), the electronic control unit in the BBW system controls the fluid pressure supplied to the wheel cylinders, to thereby obtain a desired braking force.

The braking force is controlled on the basis of a piston stroke in the above-mentioned manner. Thus, if a fluid is caused to repeatedly flow from behind the cup seal 35 to the first fluid pressure chamber 13 (a backside flow) under repetitive operation of the brake pedal 3, a reactive force acting on the brake pedal 3 increases, which makes it difficult to obtain an appropriate braking force in correspondence with operation of the brake pedal. However, in this embodiment, as indicated in FIG. 5, the outer circumferential edge of the primary-side cup seal 35 abuts against the front wall surface 38a of the annular groove 38, thus preventing the backside flow. Therefore, there is no flow of fluid from behind the primary-side cup seal 35 to the first fluid pressure chamber 13, so that a desired braking force can be stably obtained, even when the brake pedal 3 is repeatedly operated.

Next, description is made with regard to an operation of the master cylinder apparatus 1 in the event of failure of the BBW system. In this case, the fail-safe valves 2A and 2B are opened, and the master cylinder 4 is fluidly connected to the wheel cylinders. Then, the primary piston 11 advances in accordance with a force applied to the brake pedal 3, so as to increase a fluid pressure in the first fluid pressure chamber 13. The brake fluid in the first fluid pressure chamber 13 flows from the first discharge port 16 through the fail-safe valve 2A to the corresponding wheel cylinders. On the other hand, the secondary piston 12 also advances according to an increase in the fluid pressure in the first fluid pressure chamber 13, and brake fluid in the second fluid pressure chamber 15 is supplied from the second discharge port 17 through the fail-safe valve 2B to the corresponding wheel cylinders.

As the secondary piston 12 advances, as indicated in FIG. 10, the rocking lever 55 of the opening/closing means 7 rocks about the shaft portion 65, and the valve body 62 of the poppet valve 54 is seated on the valve seat 61, to thereby close the fluid passage 52 (the simulator passage 6) in the simulator body 40.

Consequently, the supply of brake fluid to the stroke simulator 5 is stopped; and as a result, the master cylinder apparatus 1 operates as a manual brake, and supplies a desired amount of brake fluid to each of the wheel cylinders.

In this state, the fluid pressure in the first fluid pressure chamber 13 acts on the rear side of the valve body 62 of the poppet valve 54. Therefore, the poppet valve 54 reliably closes the simulator passage 6, with the aid of the elastic member 64 connected to the lower end thereof. When the BBW system is normally operated, the valve body 62 of the poppet valve 54, which is in a standby condition, is suspended at a position separate from the valve seat 61. Therefore, if the valve body 62 is placed in a standby condition for a prolonged period of time, the elastic member 64 will not be subject to deformation or damage, and the simulator passage 6 can consequently be reliably closed in the event of failure of the system.

When the brake pedal 3 is released, since the spring force of the second return spring 21 is larger than that of the first return spring 20, the secondary piston 12 is first retracted, thus lowering a fluid pressure in the second fluid pressure chamber 15. Consequently, the brake fluid returns from the wheel cylinders to the second fluid pressure chamber 15, while the brake fluid is supplied from the reservoir 29 through the cup seal 37 to the second fluid pressure chamber 15. The secondary piston 12 finally abuts against the stopper pin 25. Thus, a retracted position of the secondary piston 12 is limited, and the secondary piston 12 is stopped at its initial position. In this instance, the second fluid pressure chamber 15 and the reservoir 29 are communicated with each other through the supply port 33 formed in the cup-like portion 12a of the secondary piston 12, to thereby control the brake fluid in the second fluid pressure chamber 15. On the other hand, under the spring force of the first return spring 20, the primary piston 11 returns to its initial position later than the secondary piston 12. Consequently, the first fluid pressure chamber 13 and the reservoir 29 are communicated with each other through the supply port 32 formed in the cup-like portion 11a of the primary piston 11, to thereby control the brake fluid in the first fluid pressure chamber 13. As described above, the cup seal 35 on a side of the primary piston 11 is configured to prevent the backside flow (FIG. 5). Therefore, no brake fluid is supplied from the reservoir 29 to the first fluid pressure chamber 13 during a return stroke of the primary piston 11. Thereafter, when the brake pedal 3 is operated, the primary piston 11 and the secondary piston 12 advance again. At this time, an invalid stroke is not generated, since the primary piston 11 and the secondary piston 12 are accurately returned to their initial positions by means of the piston guide 23 and the stopper pin 25. Therefore, stable braking can be conducted, even in the event of failure of the BBW system.

In this embodiment, the opening/closing means 7 is provided in the simulator passage 6 directly extended from the cylinder body 10 of the master cylinder 4 to the stroke simulator 5. Therefore, there is no need to provide an extra valve element inside the secondary piston 12, thus achieving a reduction in size of the secondary piston 12. In this embodiment, the opening/closing means 7 comprises the poppet valve 54. Therefore, it is unnecessary to use a seal member, with concomitant risk of damage, and the opening/closing means 7 can be stably operated over a prolonged period of time. This markedly improves reliability of the apparatus in the event of failure of the BBW system. Further, the poppet valve 54 is opened and closed by the rocking lever 55 which moves together with the secondary piston 12. Therefore, no special drive means is necessary for operating the poppet valve 54, which simplifies a structure of the opening/closing means 7. Further, in this embodiment, the stroke sensor 8 has a mechanism such that a linear motion of the primary piston 11 is converted to a rotational motion through engagement between the sensor pin 75 and the sensor arm 73. Therefore, the stroke sensor 8 is made simple in structure and is reduced in size, which results in an overall reduction in size of the entire apparatus.

A structure of the opening/closing means 7 is not particularly limited. Instead of the poppet valve 54 in the above-mentioned embodiment, a tilt valve, a slide valve or a spool valve may be used.

In the above-mentioned embodiment, use is made of a master cylinder in which the second return spring 21 for the secondary piston 12 has a larger spring force than the first return spring 20 for the primary piston 11. However, this does not limit the present invention. The master cylinder may be such that the first return spring 20 for the primary piston 11 has a larger spring force than the second return spring 21 for the secondary piston 12. In this case, since the retracted position of the secondary piston 12 is limited by the stopper pin 25, it is possible to avoid a phenomenon such that when the brake is released the secondary piston 12 travels an excessive distance, i.e., overshoot.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The entire disclosure of Japanese Patent Application No. 2003-341338 filed on Sep. 30, 2003 including specification, claims, drawings and summary is incorporated herein by reference in its entirety.

What is claimed is:

1. A master cylinder apparatus comprising:
a tandem-type master cylinder adapted to be connected to wheel cylinders through fail-safe valves; and
a stroke simulator for ensuring a desired stroke of a brake pedal upon receiving a brake fluid introduced from a primary-side fluid pressure chamber formed in the master cylinder,
wherein:
the tandem-type master cylinder comprises:
a cylinder body;
a primary piston and a secondary piston arranged in an axial direction of the cylinder body and being capable of sliding movement in the cylinder body;
the primary-side fluid pressure chamber, which is defined between the primary piston and the secondary piston;
a secondary-side fluid pressure chamber defined between the secondary piston and the cylinder body;
a first circumferential groove and a second circumferential groove formed in an inner surface of a bore of the cylinder body, the first circumferential groove and the second circumferential groove being spaced apart from each other in the axial direction of the cylinder body;
a first cup seal provided in the first circumferential groove and adapted to seal an outer circumferential surface of the primary piston;
a second cup seal provided in the second circumferential groove and adapted to seal an outer circumferential surface of the secondary piston;
a first return spring provided in the primary-side fluid pressure chamber so as to bias the primary piston in a direction for retraction;
a second return spring provided in the secondary-side fluid pressure chamber so as to bias the secondary piston in the direction for retraction; and
a limiting means provided in the cylinder body so as to limit a retracted position of the secondary piston.

2. A master cylinder apparatus according to claim 1, wherein the second return spring for biasing the secondary piston has a larger spring force than the first return spring for biasing the primary piston.

3. A master cylinder apparatus according to claim 1, wherein the limiting means comprises a stopper pin which extends across the bore of the cylinder body, the stopper pin being provided in an oblong hole extending through the secondary piston.

4. A master cylinder apparatus according to claim 2, wherein the limiting means comprises a stopper pin which extends across the bore of the cylinder body, the stopper pin being provided in an oblong hole extending through the secondary piston.

* * * * *